United States Patent [19]
Fruechte

[11] 3,861,623
[45] Jan. 21, 1975

[54] POWER TRANSFER SYSTEM IN A MULTI-ENGINE PROPELLER DRIVEN AIRCRAFT

[76] Inventor: Vernon D. Fruechte, R.F.D., Caledonia, Minn. 55921

[22] Filed: Sept. 11, 1973

[21] Appl. No.: 396,173

[52] U.S. Cl.................. 244/53 R, 60/403, 244/60, 416/171
[51] Int. Cl............................................ B64d 35/00
[58] Field of Search............ 244/53 R, 58, 12 B, 60; 60/403, 405; 417/374; 416/171

[56] References Cited
UNITED STATES PATENTS

| | | | |
|---|---|---|---|
| 1,827,438 | 10/1931 | Rauch | 244/53 R |
| 1,886,327 | 11/1932 | Carlson | 244/53 R |
| 2,212,490 | 8/1940 | Adler, Jr. | 244/53 R |
| 2,902,205 | 9/1959 | Parker | 417/374 |

Primary Examiner—Trygve M. Blix
Assistant Examiner—Charles E. Frankfort
Attorney, Agent, or Firm—Clarence A. O'Brien; Harvey B. Jacobson

[57] ABSTRACT

A twin engine aircraft is disclosed including a pair of engine driven shafts and a pair of overrunning clutches are mounted on the shafts with each clutch including a first member mounted on the corresponding shaft for rotation therewith and a second member journaled from the first member. Each pair of first and second members includes coacting structure operative to drive the second member from the first member in one direction of rotation and to allow rotation of the second member in the same direction in advance of the first member. A pair of gear-type fluid pumps are provided and each includes first and second gear wheel portions. The second members of the overrunning clutches comprise one of the gear wheel portions of an associated gear type pump and each of the gear type pumps includes an inlet and an outlet. The inlet of each pump is in closed communication with the outlet of the other pump. By this arrangement should one of the engines of the aircraft be disabled the gear pump driven by the other engine will drive the gear pump associated with the other engine and the propellers of the twin engine aircraft are mounted on the second members of the corresponding gear pumps.

7 Claims, 4 Drawing Figures

PATENTED JAN 21 1975

3,861,623

POWER TRANSFER SYSTEM IN A MULTI-ENGINE PROPELLER DRIVEN AIRCRAFT

In multi-engine aircraft such as a twin engine aircraft, the aircraft is capable of being flown on only one engine for reasons of safety. However, when one engine of a twin engine aircraft is disabled the pilot of the aircraft flying on the remaining engine is required to vary the controls of the aircraft in a manner such that the aircraft would normally turn toward the side of the operating engine in order to offset the thrust of the single operating engine.

The operation of the control surfaces of the aircraft in this manner creates excessive drag and the aircraft is obviously limited to the extent it may turn in the direction of the remaining operating engine.

It is accordingly the main object of this invention to provide a power transfer system for multi-engine propeller driven aircraft whereby all of the propellers of the aircraft may be driven from a single engine, whether the aircraft comprises a twin engine aircraft, a tri-motored aircraft or a four engine aircraft.

Another object of this invention is to provide a power transfer system for any pair of power output members driven by individual engines whereby both power output members may be driven by a single engine in the event of failure of one of the engines.

A final object of this invention to be specifically enumerated herein is to provide a power transfer system in accordance with the preceding objects which will conform to conventional forms of manufacture, be of simple construction and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
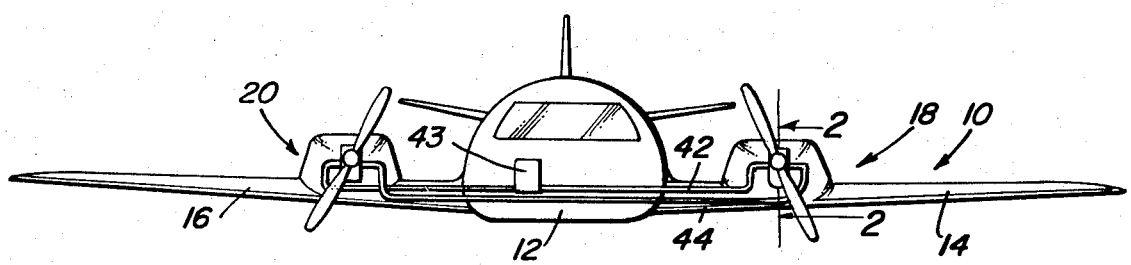
FIG. 1 is a front elevational view of a conventional form of twin engine aircraft and with the hydraulic power transfer system lines of the instant invention superimposed on the aircraft.
Figure 2:
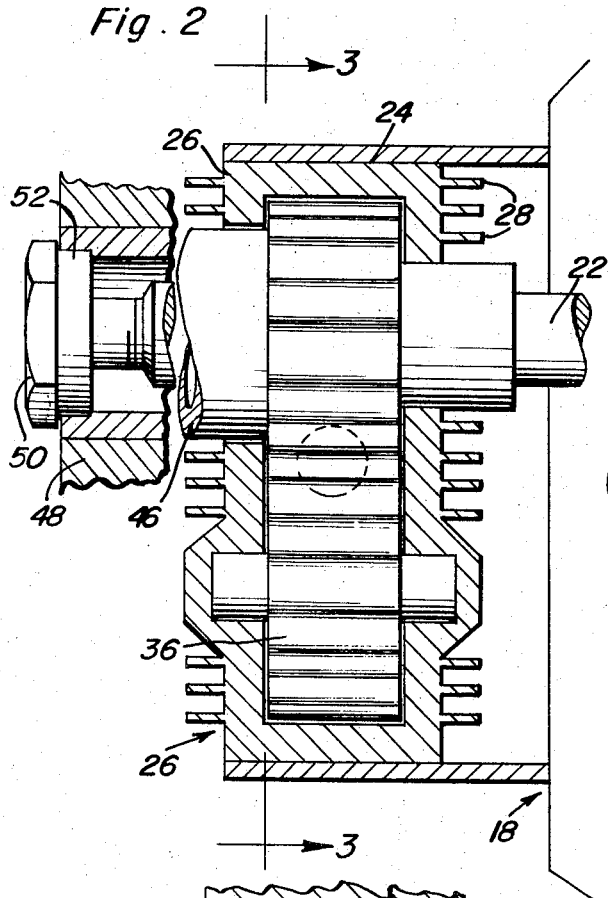
FIG. 2 is a vertical sectional view of somewhat enlarged scale taken substantially upon a plane indicated by the section line 2—2 of FIG. 1 and illustrating some of the internal structure of the associated gear type fluid pump equipped with an overrunning clutch.
Figure 3:
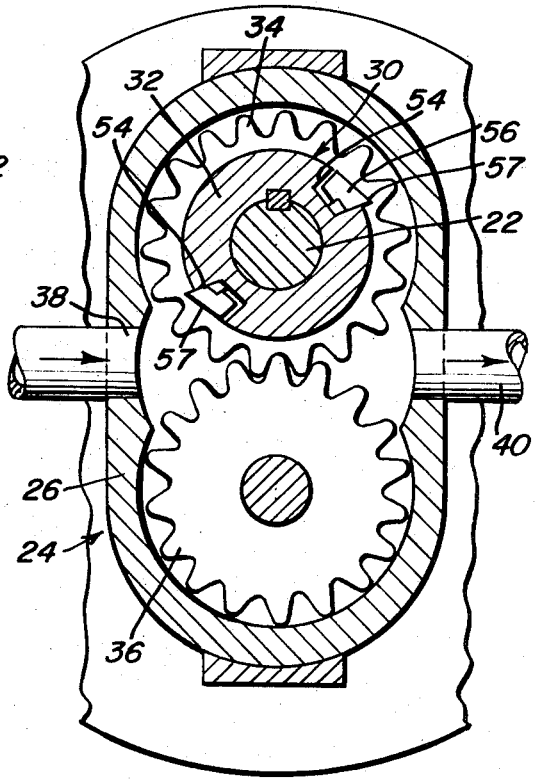
FIG. 3 is a vertical sectional view taken substantially upon the plane indicated by the section line 3—3 of FIG. 2.
Figure 4:
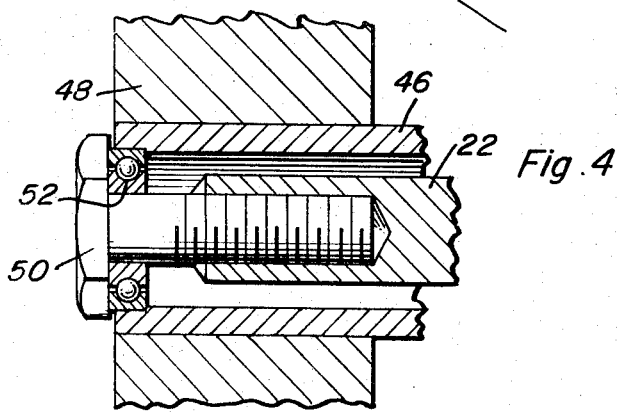
FIG. 4 is a vertical sectional view illustrating the manner in which the propeller hub is removably mounted on the output member of one of the fluid pumps.

Referring now more specifically to the drawings, the numeral 10 generally designates a twin engine aircraft including a central longitudinal fuselage 12, a pair of opposite side wings 14 and 16 and a pair of engines referred to in general by the reference numerals 18 and 20 mounted on the wings 14 and 16.

Each of the engines includes a driven or power output shaft 22 and each power output shaft 22 extends into a gear type fluid pump referred to in general by the reference numeral 24. Each pump 24 includes an outer housing 26 equipped with air cooling fins 28 and an overrunning clutch assembly referred to in general by the reference numeral 30 is mounted on each of the shafts 22 within the corresponding housing 26. Each overrunning clutch includes a first member 32 mounted on and keyed to the corresponding shaft 22 and a second member 34 journaled on the corresponding first member 32 and comprising a first gear wheel portion. Each pump 24 includes a second gear wheel portion 36 meshed with the corresponding first gear wheel portion 34 and each pump 24 includes an inlet 38 and an outlet 40. A pair of hydraulic lines 42 and 44 connect the outlet of the pump 24 driven from the engine 20 with the inlet of the pump 24 driven from the engine 18 and the outlet of the pump driven from the engine 18 to the inlet of the pump driven from the engine 20, a reservoir 43 being disposed in line 42.

The second member 34 of each pump 24 includes a forwardly and outwardly projecting propeller shaft portion 46 upon which a propeller hub 48 is mounted. A threaded fastener 50 equipped with a thrust bearing 52 is utilized to absorb the forward thrust of the propeller shaft portion 46 relative to the corresponding shaft 22 when the associated engine is not operative.

Each second member 34 includes circumferentially spaced inwardly opening recesses 57 and each first member 32 includes circumferentially spaced recesses 54 in which spring urged retractable dogs 56 are disposed and the dogs 56 are engageable in the corresponding recess 57 in order to drive the second members 34 from the first members 32 when torque is delivered to the first members 32 from the shafts 22.

In the event one of the engines 18 and 20 is rendered inoperative, the remaining engine by driving its propeller and gear pump causes hydraulic fluid to be pumped from the driven pump to the other pump and through the latter in order to drive the second member 34 thereof upon whose propeller shaft portion 46 the corresponding propeller hub 48 is mounted. Thus, in the event of failure of one of the engines 18 and 20 the remaining operative engine will be capable of driving both propeller hub portions 48.

It may be appreciated that the herein above system is also capable of being utilized effectively on tri-motor aircraft as well as aircraft including four engines or more. Also, it is believed evident that the recesses and dogs 54 and 56 of the gear type fluid pump 24 driven from the engine 20 will face in opposite directions from the recesses 54 and dogs 56 of the gear pump driven from the engine 18, at least in the installation illustrated in the drawings. However, it will be appreciated that the various fluid pumps 24 (any number desired) may drive in any direction according to the drive directions of the associated engines or motors corresponding to the engines 18 and that it is merely necessary to properly connect the lines 42 and 44 to the various pumps 24 and that the direction in which each set of coating recesses 54 and dogs 56 face may be changed according to the desired direction of rotation of the shaft portion 46.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a pair of driven shafts, a pair of overrunning clutches mounted on said shafts each including a pair of members including a first member mounted on the corresponding shaft for rotation therewith and a second member journaled relative to said first member, each pair of members including coacting means operative to drive the second member from the first member in one direction of rotation and to allow rotation of the second member in said one direction in advance of said first member, a pair of gear type fluid pumps each including first and second gear wheel portions, said second members each comprising one gear wheel portion of a corresponding gear type fluid pump, each of said gear type fluid pumps including an inlet and an outlet, the inlet of each of said pumps being in closed communication with the outlet of the other of said pumps.

2. The combination of claim 1 wherein each of said second members comprises the propeller shaft of an aircraft, said aircraft including a pair of engines whose output shafts comprise said driven shafts.

3. The combination of claim 1 wherein said second members include hollow cylindrical portions journaled on said first portions.

4. The combination of claim 1 wherein each of said second members comprises the propeller shaft of an aircraft, said aircraft including a pair of engines whose output shafts comprise said driven shafts, said aircraft comprising a twin engine aircraft whose engine output shafts are driven in opposite directions by the associated engines.

5. The combination of claim 1 wherein said second members include hollow cylindrical portions journaled on said first portions, said coacting means comprising radially inwardly and circumferentially opening recess means formed on the inner surface of said hollow cylindrical portions and spring biased radially outwardly projectable ratchet lug means carried by said first members and projectable into said recesses upon rotation of said driven shaft in said one direction in advance of said second members.

6. The combination of claim 5 wherein each of said second members comprises the propeller shaft of an aircraft, said aircraft including a pair of engines whose output shafts comprise said driven shafts.

7. The combination of claim 6 wherein said aircraft comprises a twin engine aircraft whose engine output shafts are driven in opposite directions by the associated engines.

* * * * *